United States Patent
Herrmann et al.

(10) Patent No.: US 10,807,354 B2
(45) Date of Patent: Oct. 20, 2020

(54) ACTIVE LIGHT EMITTING DIODE ULTRA VIOLET CURING SYSTEM FOR A THREE DIMENSIONAL OBJECT PRINTER

(71) Applicant: Xerox Corporation, Norwalk, CT (US)

(72) Inventors: Douglas K. Herrmann, Webster, NY (US); Paul McConville, Webster, NY (US); Jason Matthew LeFevre, Penfield, NY (US); Seemit Praharaj, Webster, NY (US); Michael Jon Levy, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 483 days.

(21) Appl. No.: 15/473,250

(22) Filed: Mar. 29, 2017

(65) Prior Publication Data

US 2018/0281311 A1    Oct. 4, 2018

(51) Int. Cl.
   *B33Y 50/02*    (2015.01)
   *B33Y 10/00*    (2015.01)
   *B33Y 30/00*    (2015.01)
   *B29C 64/112*   (2017.01)
   *B29C 64/386*   (2017.01)

(52) U.S. Cl.
   CPC .......... *B33Y 50/02* (2014.12); *B29C 64/112* (2017.08); *B29C 64/386* (2017.08); *B33Y 10/00* (2014.12); *B33Y 30/00* (2014.12)

(58) Field of Classification Search
   CPC ......... B33Y 50/02; B33Y 10/00; B33Y 30/00; B29C 64/112; B29C 64/386
   See application file for complete search history.

(56) References Cited

U.S. PATENT DOCUMENTS

| | | | |
|---|---|---|---|
| 7,300,129 B2 | 11/2007 | Kumamoto et al. | |
| 7,766,473 B2 | 8/2010 | Hoshino | |
| 9,827,790 B1* | 11/2017 | Moore | B41M 3/008 |
| 2003/0151656 A1 | 8/2003 | Kokubo et al. | |
| 2006/0201018 A1 | 9/2006 | McKay et al. | |
| 2006/0290760 A1* | 12/2006 | German | B41J 11/002 347/102 |
| 2007/0058020 A1 | 3/2007 | Wetjens et al. | |
| 2009/0207203 A1 | 8/2009 | Yamamoto | |

(Continued)

OTHER PUBLICATIONS

Consolidated Label Company "UPC Barcodes: What You Need to Know" Jan. 20, 2015. (Year: 2015).*

(Continued)

*Primary Examiner* — Robert S Walters, Jr.

(57) ABSTRACT

A print system and a method for curing marking material on an object using an active LED array in a three dimensional (3D) object printer are disclosed. For example, the print system includes a plurality of printheads, a curing light source comprising a plurality of light emitting diodes (LED) that are independently addressable, a movable member to hold an object, and a controller to control movement of the movable member to move the object past the array of printheads, to operate the plurality of printheads to eject the marking material onto the object as the object passes the two-dimensional array of printheads, to control movement of the movable member and to operate each one of the plurality of LEDs of the curing light source to apply energy in accordance with a shape of the object to cure the marking material.

7 Claims, 5 Drawing Sheets

(56) References Cited

U.S. PATENT DOCUMENTS

| | | |
|---|---|---|
| 2010/0154244 A1 | 6/2010 | Kuta et al. |
| 2010/0192792 A1 | 8/2010 | Hall et al. |
| 2010/0328083 A1 | 12/2010 | Dillon |
| 2013/0044172 A1 | 2/2013 | Nakajima |
| 2014/0002557 A1 | 1/2014 | Condello et al. |
| 2014/0242346 A1 | 8/2014 | Nielsen et al. |
| 2015/0224680 A1 | 8/2015 | Oestergaard et al. |
| 2015/0231897 A1 | 8/2015 | Noell |

OTHER PUBLICATIONS

Kay "Using Multi-Zone Irradiance Control in UV LED Systems" ASI Adhesives & Sealants Industry Oct. 1, 2015.*
Detecting VOCs with PID—how it works. Crowcon Detection Instrucments LTD. May 7, 2015, Retrieved online Sep. 17, 2019.
Zeng "Control of Robotic UV Curing Process with Thermal Vision Feedback Through Two IR Cameras", Proceedings of the ASME 2009 International Mechanical Engineering Congress & Exposition, IMECE 2009-13007, pp. 1-9, 2009.

* cited by examiner

ACTIVE LIGHT EMITTING DIODE ULTRA VIOLET CURING SYSTEM FOR A THREE DIMENSIONAL OBJECT PRINTER

The present disclosure relates generally to curing systems and, more particularly, to a method and system for active LED UV curing in a 3D object printer and methods for using the same.

BACKGROUND

Some printers use UV curable inks to print on articles and objects. UV curable inks are applied onto the article or object and a UV light source is used to cure the ink. The UV light source may be used to initiate a photochemical reaction that generates a crosslinked network of polymers. In other words, the ink is not simply "dried" where solvent is evaporated from the ink. Rather, the UV ink is cured such that the polymers in the UV ink undergo a chemical reaction to link or bond to the article or object.

A curing light source may be used to apply light to cure the UV curable ink. However, if the curing light source does not emit the proper amount of light, the UV curable ink may not completely cure. Uncured UV inks may emit some volatile organic compounds (VOCs). VOCs are considered to have a negative impact on the environment and the end user. Furthermore, if the UV ink is not completely cured, the UV ink that is printed onto the article or object may be wiped off.

Three dimensional objects have varying slopes, angles and curvatures that do not provide a flat and even surface for curing. As a result, different portions of the three dimensional object may be different distances away from the curing light source. The different distances may cause the curing light source to cure the UV curable ink on the three dimensional object at different rates. Thus, the UV curable ink may not be properly cured on different surfaces of the three dimensional object.

SUMMARY

According to aspects illustrated herein, there are provided a print system and a method for curing marking material on an object using an active LED array in a three dimensional (3D) object printer. One disclosed feature of the embodiments is a print system that comprises a plurality of printheads arranged in a two-dimensional array, wherein each one of the plurality of printheads is configured to eject a marking material, a curing light source coupled to the two-dimensional array of the plurality of printheads, the curing light source comprising a plurality of light emitting diodes (LED) that are independently addressable, a movable member to hold an object, wherein the movable member is positioned parallel to a plane formed by the two-dimensional array of the plurality of printheads and the curing light source and a controller to control movement of the movable member to move the object past the array of printheads, to operate the plurality of printheads to eject the marking material onto the object as the object passes the two-dimensional array of printheads, to control movement of the movable member and to operate each one of the plurality of LEDs of the curing light source to apply energy in accordance with a shape of the object to cure the marking material.

Another disclosed feature of the embodiments is a method for curing marking material on an object using an active LED array in a three dimensional (3D) object printer. In one embodiment, the method comprises ejecting the marking material onto the object via a two-dimensional array of a plurality of printheads, moving a movable member holding the object vertically parallel to a plane formed by the two-dimensional array of the plurality of printheads towards a curing light source, activating one or more light emitting diodes (LEDs) of a two-dimensional array of LEDs of the curing light source in a sequence that follows a shape of an object as the object moves past the curing light source and curing the marking material on the object via the one or more LEDs that are activated in the sequence that follows the shape of the object as the object moves past the curing light source.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an apparatus and method for curing marking material on an object using an active LED array. As discussed above, some printers use UV curable inks to print on articles and objects. UV curable inks are applied onto the article or object and a UV light source is used to cure the ink. The UV light source may be used to initiate a photochemical reaction that generates a crosslinked network of polymers. In other words, the ink is not simply "dried" where solvent is evaporated from the ink. Rather, the UV ink is cured such that the polymers in the UV ink undergo a chemical reaction to link or bond to the article or object.

A curing light source may be used to applying light to cure the UV curable ink. However, if curing light source malfunctions or does not emit the proper amount of light, the UV curable ink may not completely cure. Uncured UV inks may emit some volatile organic compounds (VOCs). VOCs are considered to have a negative impact on the environment and the end user. Furthermore, if the UV ink is not completely cured, the UV ink that is printed onto the article or object may be wiped off.

Three dimensional objects have varying slopes, angles and curvatures that do not provide a flat and even surface for curing. As a result, different portions of the three dimensional object may be different distances away from the curing light source. The different distances may cause the curing light source to cure the UV curable ink on the three dimensional object at different rates. Thus, the UV curable ink may not be properly cured on different surfaces of the three dimensional object.

Embodiments of the present disclosure provide a novel apparatus and method that control the amount of light from a curing light source using an active LED array. Each LED within the active LED array may be independently addressable or controlled. The amount of light emitted by each LED within the LED array may be controlled and varied based on a distance of the LED from a surface of the object. As the object moves past the LED array, the amount of light from each LED may be controlled such that the proper light intensity follows the corresponding location on the surface of the object. As a result, the embodiments of the present disclosure provide more control of the curing process and more consistent curing over all surfaces of the object that have the marking material.

Figure 1:
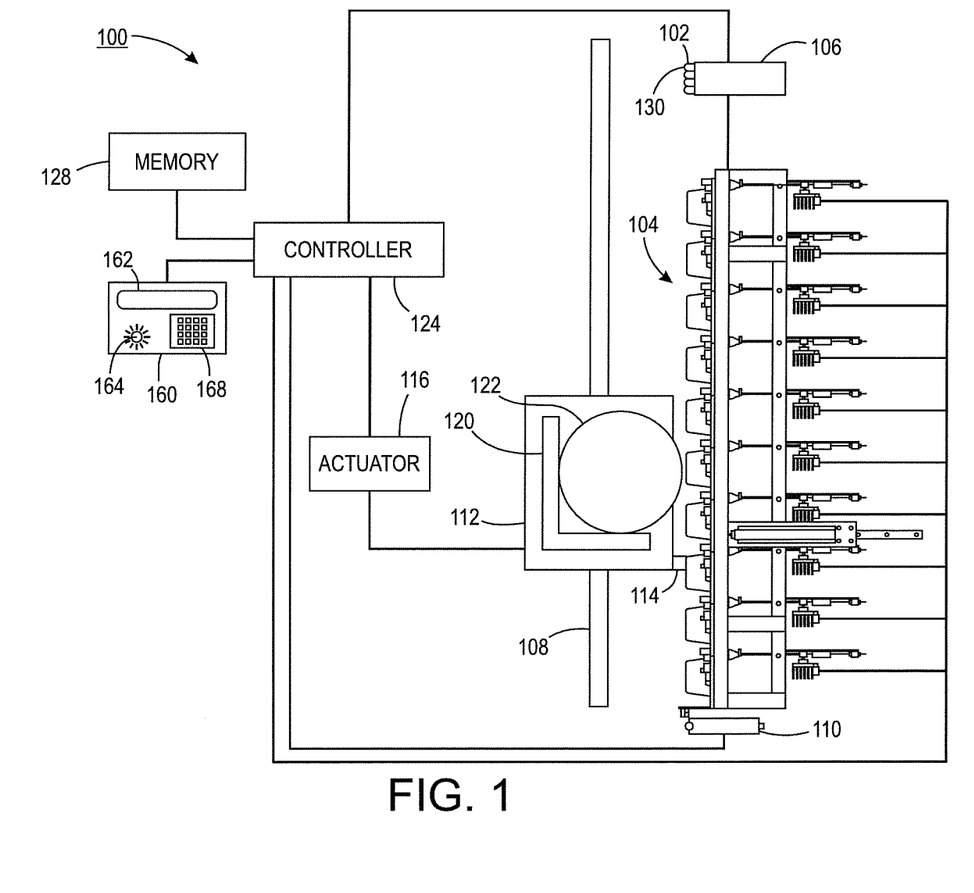
FIG. 1 illustrates an example 3D object printer of the present disclosure.

FIG. 1 illustrates an exemplary printing system 100 configured to print on an object 122. The object 122 may be a three dimensional (3D) object that has an irregular shape. For example, the object 122 may have one or more different curved surfaces with different amounts of curvature. Said another way, the object 122 may not have a flat surface.

In one embodiment, the printing system 100 includes an array, or a plurality, of printheads 104, a support member 108, a member 112 movably mounted to the support member 108, an actuator 116 operatively connected to the movably mounted member 112, an object holder 120 configured to mount to the movably mounted member 112 and a controller 124 operatively connected to the plurality of printheads and the actuator. As shown in FIG. 1, the array of printheads 104 is arranged in a two-dimensional array, which in the figure is a 10×1 array, although other array configurations can be used. Each printhead is fluidly connected to a supply of marking material (not shown) and is configured to eject marking material received from the supply. Some of the printheads can be connected to the same supply or each printhead can be connected to its own supply so each printhead can eject a different marking material.

In one embodiment, the marking material may be an ultra violet (UV) ink. The marking material may be cured by a curing light source 106. The curing light source 106 may be positioned to cure the marking material after the marking material is ejected by the array of printheads 104. For example, the curing light source 106 may be positioned vertically above or below the array of printheads 104 depending on which direction printing occurs along the support member 108. Said another way, the curing light source 106 may be stacked above or below the array of printheads 104 along a plane formed by the array of printheads 104.

In one embodiment, the controller 124 may also be operatively coupled to the curing light source 106 to control an amount and a duration of light applied to the marking material for curing. In other words, the curing light source 106 may be used to initiate a photochemical reaction that generates a crosslinked network of polymers. In other words, the ink is not simply "dried" where solvent is evaporated from the ink. Rather, the marking material (e.g., the UV ink) is cured such that the polymers in the marking material undergo a chemical reaction to link or bond to the object 122.

In one embodiment, the curing light source 106 may include a two dimensional array of light emitting diodes (LEDs) 130. The LEDs 130 may be UV emitting LEDs that can cure the marking material. Each one of the LEDs 130 may be independently addressable. In other words, the luminosity or light intensity of each LED 130 within the two dimensional array of LEDs 130 may be controlled independent of the other LEDs 130.

Figure 2:
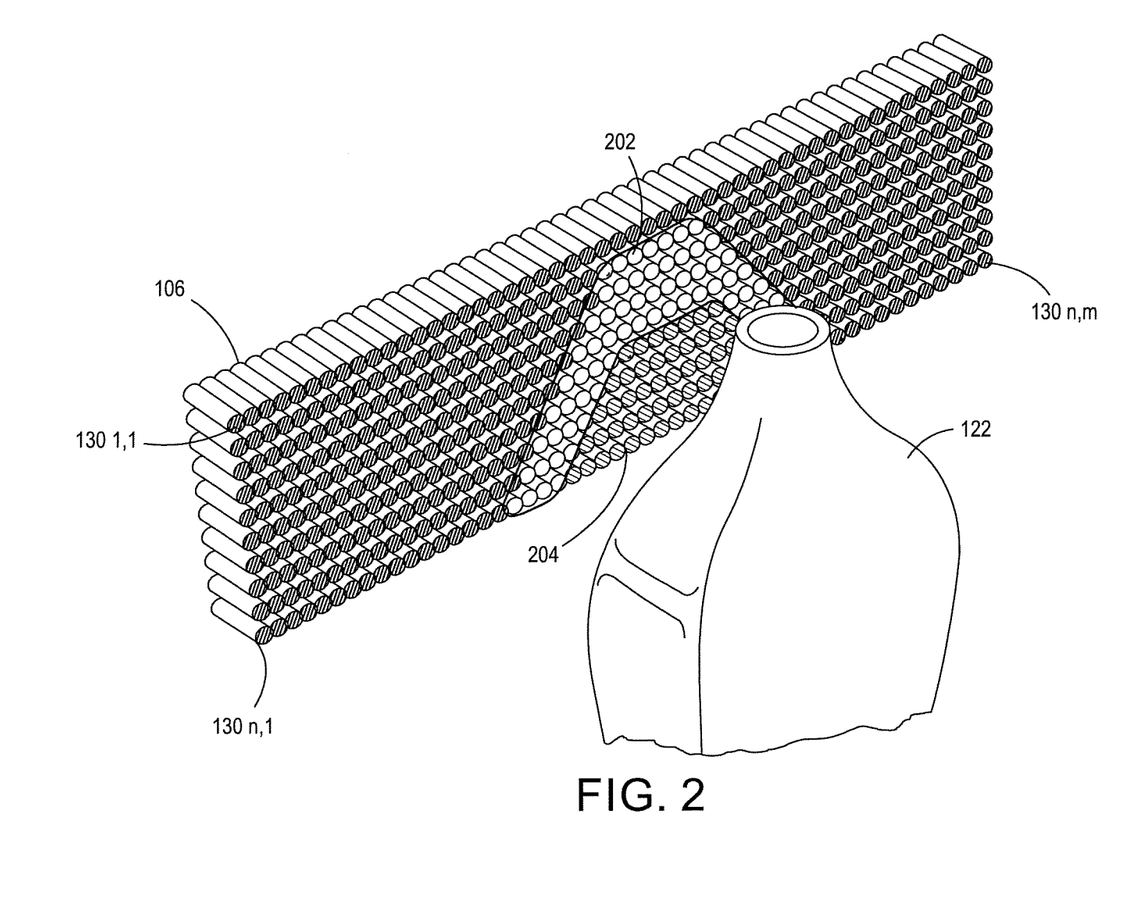
FIG. 2 illustrates a detailed block diagram of a curing light source with an active LED array.

FIG. 2 illustrates an example of the LEDs 130 of the curing light source 106. In one embodiment, the two-dimensional array of LEDs 130 may comprises an array of n rows and m columns. Each one of the LEDs 130 may be independently controlled to emit a different light intensity. For example, the light intensity may be controlled to be anywhere from zero to a maximum light intensity value. For example, the LEDs 130 within a highlighted area 202 may emit a first light intensity. The LEDs 130 within a highlighted area 204 may emit a second light intensity that is different than the first light intensity. The LEDs 130 that are outside of the highlighted areas 202 and 204 may be turned off and emit zero light.

In one embodiment, the light intensity emitted by a particular LED 130 may be a function of a distance between the particular LED 130 and a corresponding location of a surface of the object 122 that is positioned in front of the particular LED 130 at a particular time. In one embodiment, a predefined light intensity value may be set for a predefined distance between the LED 130 and the surface of the object 122. The predefined intensity value may be a value that is between zero and the maximum light intensity value that can be emitted by the LEDs 130. As a result, the light intensity can be adjusted lower and higher within the range of zero and the maximum light intensity value. As the distance increases, the light intensity value may also be increased. As the distance decreases, the light intensity value may also be decreased.

For example, the surface of the object 122 may have different contours, curves, elevations, sections and the like. The surface of the object 122 that is in front of the LEDs 130 within the highlighted area 202 may be at a distance that is greater than the predefined distance. As a result, the LEDs 130 within the highlighted area 202 may be controlled to emit a higher light intensity than the predefined light intensity value. The surface of the object 122 may be curved to be closer to the curing light source 106 towards a center of the object 122. Thus, the surface of the object that is in front of the LEDs 130 within the highlighted area 204 may be at a distance that is less than the predefined distance. As a result, the LEDs 130 within the highlighted area 204 may be controlled to emit a lower light intensity than the predefined light intensity value.

In one embodiment, the two-dimensional array of LEDs 130 may be an active LED array. In other words, different ones of one or more of the LEDs 130 in each row of the two-dimensional array may be activated and deactivated at different times as the object 122 moves past the curing light source 106. In addition, the different ones of the one or more of the LEDs 130 in each row of the two-dimensional array may emit different light intensities at different times as the object 122 moves past the curing light source 106.

Figure 3:
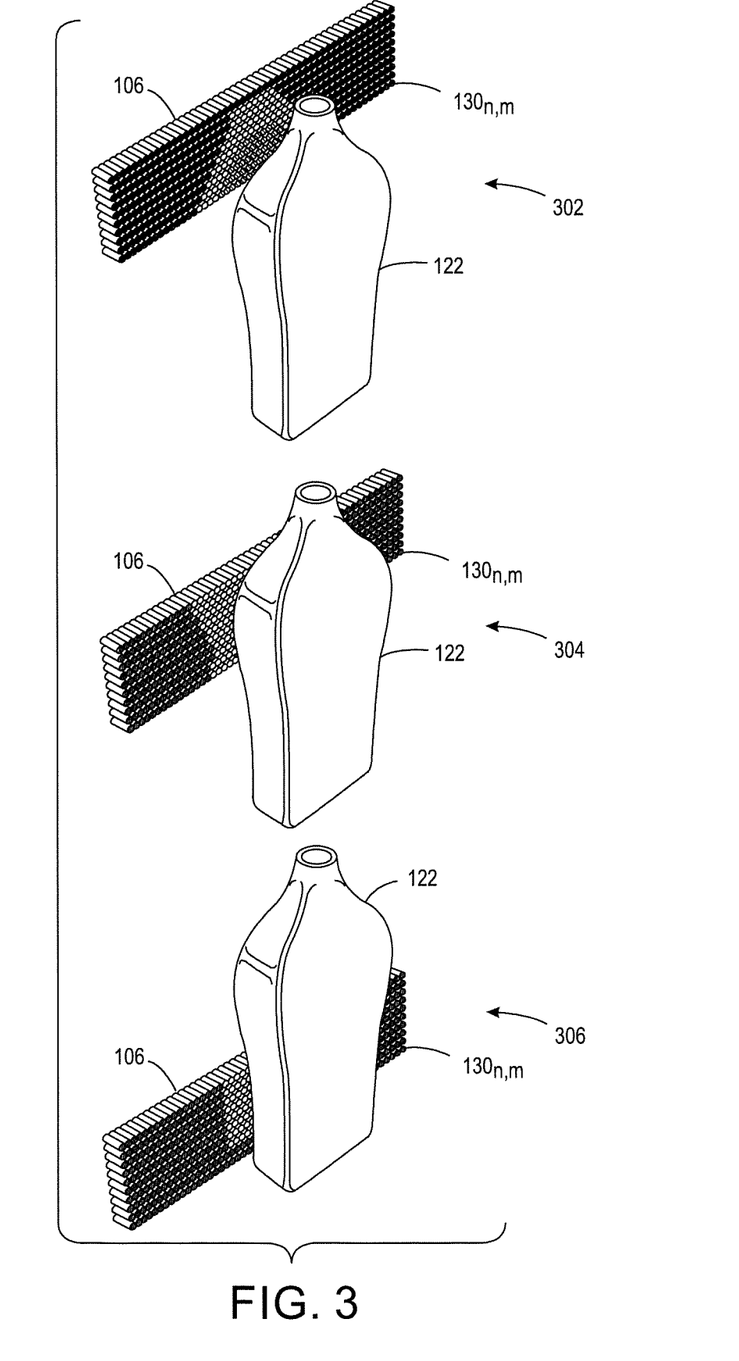
FIG. 3 illustrates a detailed block diagram of an object moving past the curing light source with the active LED array.

In one embodiment, the two-dimensional array of LEDs 130 may be activated such that the two-dimensional array of LEDs 130 appears to be mirroring, or tracing, a shape of the object 122 as the object 122 moves past the two-dimensional array of LEDs 130. FIG. 3 illustrates an example of how the LEDs 130 are activated as the object 122 moves past the curing light source 106.

At a time 302, the object 122 may begin passing in front of the curing light source 106. One or more of the LEDs 130 of the two dimensional array of LEDs 130 may be activated. Each row of LEDs 130 may have one or more LEDs 130 that are activated and have LEDs 130 that emit different light intensity values. The LEDs 130 may be controlled to emit light intensity based on a function of a distance between a surface of the object 122 and the LEDs 130. In addition, the LEDs 130 may be activated in accordance with a shape, or outline, of the object to cure the marking material. For example, at time 302 the LEDs are shown with different shading that indicates the LEDs are emitting different light intensity values.

At time 304 that occurs after time 302, the object 122 has moved further past the curing light source 106. Different LEDs 130 in each row of the two-dimensional array of LEDs 130, compared to the LEDs 130 that were activated at time 302, may be activated as a different portion of the object 122 is positioned in front of the curing light source 106.

At time 306, that occurs after time 302 and 304, the object 122 has moved further past the curing light source 106. Again, different LEDs 130 in each row of the two-dimensional array of LEDs 130, compared to the LEDs 130 that were activated at time 302 and 304, may be activated as a different portion of the object 122 is positioned in front of the curing light source 106.

It should be noted that the object 122 is continuously moving past the curing light source 106 at a constant velocity. As a result, different LEDs 130 in each row of the two-dimensional array of LEDs 130 may be activated on at an appropriate light intensity and turned off in a sequence that follows the shape of the object 122. In other words, the active two-dimensional array of LEDs 130 may animate portions of the object 122 passing by the curing light source 106 via control of the LEDs 130.

Referring back to FIG. 1, in one embodiment, the printing system 100 may include an optical sensor 110. The optical sensor 110 may be a scanner to scan a stock keeping unit (SKU), a barcode, or any other machine readable mark on the object 122. The SKU may provide information to the controller 124 with regards to which a shape of the object 122.

In another embodiment, the optical sensor 110 may scan the object 122 and collect a scan of the object 122. The scan of the object 122 may be transmitted to the controller 124. The controller 124 may then calculate the dimensions (e.g., a length and a width) of the object 122, the contours of the object 122 (e.g., a distance between each LED and a corresponding location on a surface of the object), and the like.

In one embodiment, the controller 124 may also be operatively coupled to an interface 160. The interface 160 may include a display 162, an annunciator 164 and an input device 168, such as a keypad. The interface 160 may be used to allow an operator to input, via the input device 168, the SKU of the object or manually enter the dimensions of the object 122, the contours of the object 122, and the like.

In one embodiment, the controller 124 may know the velocity of the object 122 since the controller 124 controls the actuator 116 that moves the member 112 holding the object 122. In one embodiment, with the dimension information obtained by one of the above embodiments, the controller 124 may control each one of the LEDs 130 in the two-dimensional array of LEDs 124 in a sequence that traces, or follows, a shape of the object 122, as illustrated in FIG. 3.

Referring back to FIG. 1, in one embodiment, the support member 108 is positioned to be parallel to the plane formed by the array of printheads and, as shown in FIG. 1, is oriented so one end of the support member 108 is at a higher gravitational potential than the other end of the support member 108. This orientation enables the printing system 100 to have a smaller footprint than an alternative embodiment that horizontally orients the two-dimensional array of printheads and configures the support member, the member, and the object holder to enable the object holder to pass objects past the horizontally arranged printheads so the printheads can eject marking material downwardly on the objects.

The member 112 is movably mounted to the support member 108 to enable the member to slide along the support member 108. In some embodiments, the member 112 can move bi-directionally along the support member 108. In other embodiments, the support member 108 is configured to provide a return path to the lower end of the support member 108 to form a track for the member 112. The actuator 116 is operatively connected to the member 112 so that the actuator 116 can move the member 112 along the support member 108 and enable the object holder 120 connected to the member 112 to pass the two-dimensional array of the plurality of printheads 104 in one dimension of the two-dimensional array of printheads 104.

In the embodiment, the object holder 120 moves the object 122 along a length dimension of the array of printheads 104. The object holder 120 may have different shapes and sizes depending on a shape and size of the object 122. For example, different object holders 120 may be coupled to the member 112 for different objects 122. The object holder 120 may be custom built for each different type of object 122 that is used in the printing system 100.

As noted above, the printing system 100 may include the optical sensor 110. The optical sensor 110 may scan the SKU on the object 122 to provide additional information to the controller 124. For example, the SKU may also provide information such as how to control the array of printheads 104 to print an image onto the surface of the object 122. For example, different shaped objects 122 may have different printing profiles that may be included into the SKU.

In one embodiment, the optical sensor 110 may be a scanner that can scan the object 122 to determine a profile of the object 122. For example, the printing system 100 may determine a printing profile on-the-fly using the optical sensor 110. The surface profile scanned by the optical sensor 110 may be transmitted to the controller 124. The controller 124 may then calculate a sequence of operation of the printheads of the array of printheads 104 and an amount of marking material to eject from each printhead.

In one embodiment, the controller 124 is configured with programmed instructions stored in a memory 128 operatively connected to the controller so the controller can execute the programmed instructions to operate components in the printing system 100. Thus, the controller 124 is configured to operate the actuator 116 to move the object holder 120 past the array of printheads 104 and to operate the array of printheads 104 to eject marking material onto the object 122 held by the object holder 120 as the object holder 120 passes the array of printheads 104.

In one embodiment, the interface 160 may also be used to notify an operator if a printing program for a particular SKU is not available, display error messages, completion messages, and the like, on the display 162. The annunciator 164 may provide a warning light or an audible alarm to attract attention to messages on the display 162 or to indicate an error has occurred.

Additionally, the controller 124 is configured to operate the inkjets within the printheads of the array of printheads 104 so they eject drops with larger masses than the masses of drops ejected from such printheads. In one embodiment, the controller 124 operates the inkjets in the printheads of the array of printheads 104 with firing signal waveforms that enable the inkjets to eject drops that produce drops on surfaces of the object 122 having a diameter of about seven to about ten millimeters (mm). This drop size is appreciably larger than the drops that produced drops on the material receiving surface having a mass of about 21 nanograms (ng).

It should be noted that the orientation of the components of the printing system 100 is provided as an example. For example, FIG. 1 illustrates the printing process moved vertically upwards from the bottom of the page towards the top of the page. However, it should be noted that the components may be flipped such that the printing process may move vertically downwards from the top of the page to the bottom of the page.

The system configuration shown in FIG. 1 is especially advantageous in a number of aspects. For one, as noted above, the vertical configuration of the array of printheads 104 and the support member 108 enables the printing system 100 to have a smaller footprint than a system configured with a horizontal orientation of the array and support member. This smaller footprint of the printing system 100 enables the printing system 100 to be housed in a single cabinet and installed in non-production outlets. Once installed, various object holders can be used with the system to print a variety of goods that are generic in appearance until printed.

Another advantageous aspect of the printing system 100 shown in FIG. 1 is the gap presented between the objects 122 carried by the object holder 120 and the printheads of the array of printheads 104. The gap in this embodiment is in a range of about five to about six mm. Heretofore, the gap was maintained in a range centered about 1 mm. This smaller gap was thought to ensure a more accurate placement of drops from an ejecting printhead. It has been discovered that the greater gap width reduces the effect of laminar air flow in the gap between the printheads and the surface receiving the marking material drops so the accuracy of drop placement, especially for larger 3D objects, is maintained. This effect is particularly effective with the larger drop sizes noted previously. Without the turbulence produced by the movement of an object in close proximity to a printhead, the momentum of the ejected drops is adequate to keep the drops on their projected course so the registration of the drops from different printheads can be preserved for maintaining image quality. Additionally, the controller 124 can be configured with programmed instructions to operate the actuator 116 to move the object holder 120 at speeds that attenuate the air turbulence in the larger gap between the printhead and the surface of the object 122 used in the printing system 100.

Figure 4:
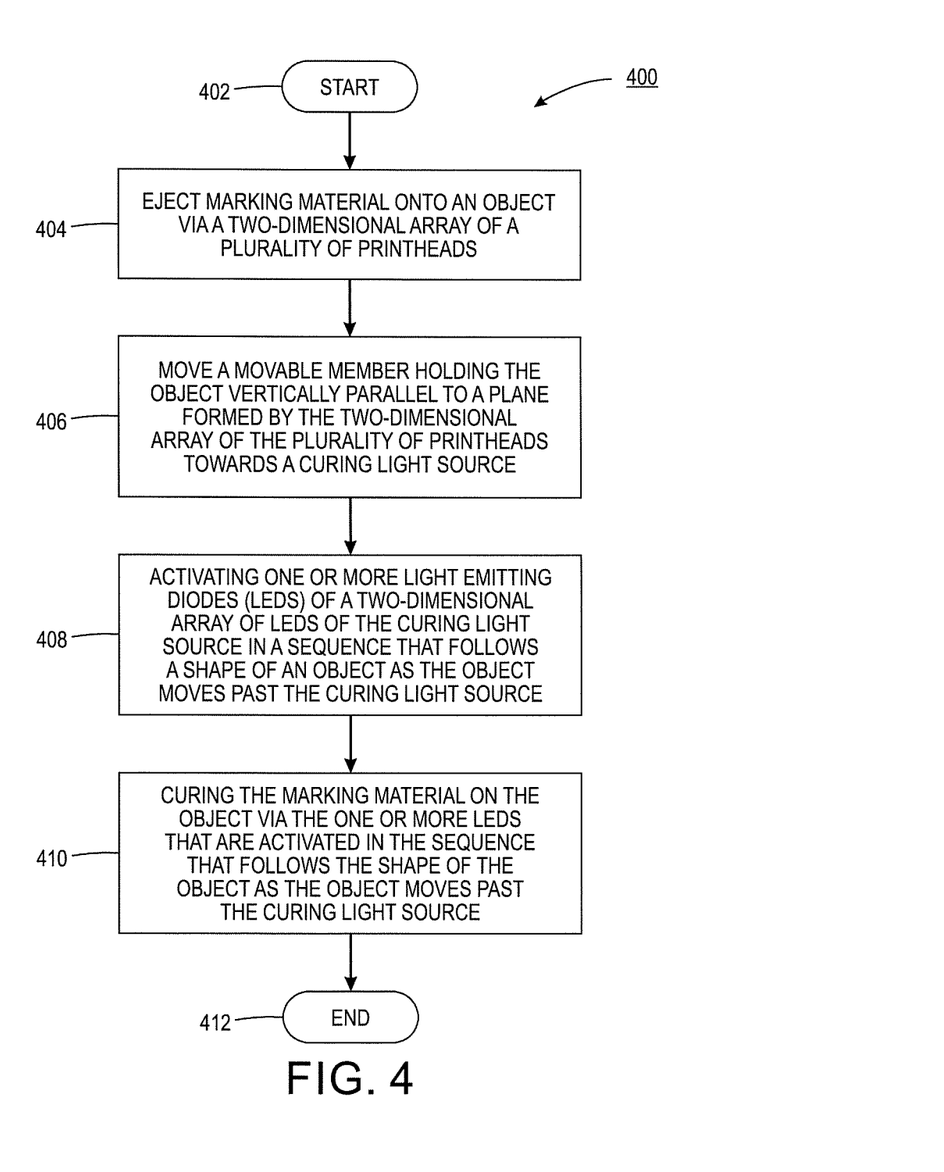
FIG. 4 illustrates a flowchart of an example method for curing marking material on an object using an active LED array in a 3D object printer.
Figure 5:
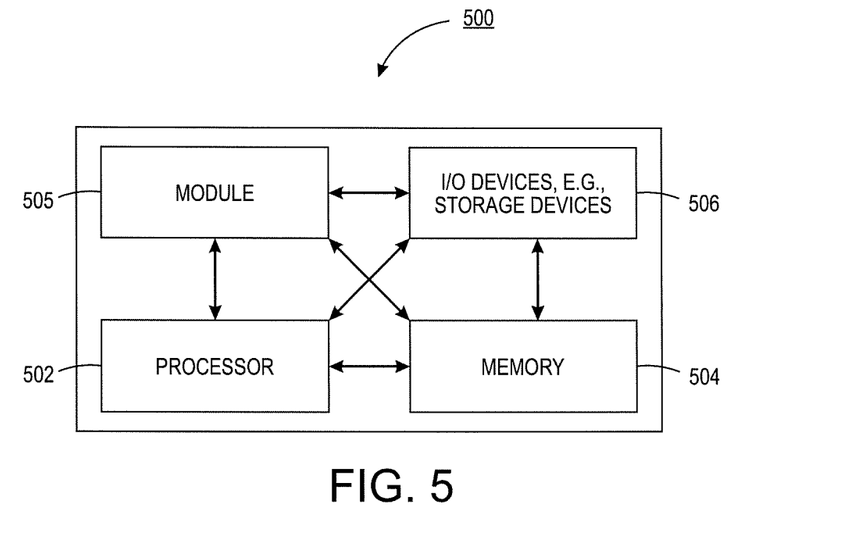
FIG. 5 illustrates a high-level block diagram of a computer suitable for use in performing the functions described herein.

FIG. 4 illustrates a flowchart of an example method 400 for curing marking material on an object using an active LED array in a 3D object printer. In one embodiment, one or more steps or operations of the method 400 may be performed by the printing system 100 or a computer that controls operation of the printing system 100 as illustrated in FIG. 5 and discussed below.

At block 402, the method 400 begins. At block 404, the method 400 ejects marking material onto an object via a two-dimensional array of a plurality of printheads. For example, the object may be moved vertically up and down along a support member via a movable member and object holder. The printheads may have different colors. The object may be moved in front of the printheads to receive the marking material that is ejected from the printheads according to a printing process or program that is executed by the controller.

At block 406, the method 400 moves a movable member holding the object vertically parallel to a plane formed by the two-dimensional array of the plurality of printheads towards a curing light source. After the printing on the object is completed, the object may be moved to a curing station to cure the marking material. In one embodiment, the plane may be an imaginary surface to which each one of the plurality of printheads may be aligned. The object may move parallel to this plane vertically up and down.

At block 408, the method 400 activates one or more LEDs of a two-dimensional array of LEDs of the curing light source in a sequence that follows a shape of an object as the object moves past the curing light source. For example, as a first portion of the object initially crosses the first row of LEDs (e.g., a bottom row when the object is moving past the curing light source from a bottom of the curing light source to the top of the curing light source), one or more of the LEDs in the first row of the LEDs may be activated. In one embodiment, the first portion of the object may be equivalent to a width or diameter of the LEDs, or a width or diameter of a beam spread of the LEDs in a row of the two-dimensional array of LEDs.

In one embodiment, the one or more LEDs that are activated may be the LEDs that are positioned in front of a corresponding surface of the object. In one embodiment, the controller may know which LEDs to activate based on a scan of the object or dimensions of the object that are provided by scanning a SKU bar code or entered via an interface of the print system by an operator.

In one embodiment, the light intensity emitted by the one or more LEDs that are activated in the first row may be determined based on a distance between an LED and a corresponding surface of the object that is positioned in front of the LED. The greater the distance, the higher the light intensity that is emitted by the LED. The shorter the distance, the lower the light intensity that is emitted by the LED. The LEDs that are activated may emit different light intensities based on the contour or shape of the object.

As the object is moving past the curing light source, a next row of the one or more LEDs that correspond to the shape of the first portion of the object may be activated as the first portion of the object moves in front of the next row of the two-dimensional array of LEDs. For example, the second row above the first row may activate LEDs in the same column as the LEDs that were activated in the first row when the first portion of the object moved past the first row of LEDs.

At the same time, a second, or next, portion of the object may now pass the first row of LEDs. One or more LEDs that correspond to the shape of the second portion of the object may be activated when the second portion of the object is in front of the second row of LEDs in the two-dimensional array of LEDs. In one embodiment, the one or more LEDs that are activated for the second portion of the object may be different than the one or more LEDs that were activated in the first row for the first portion of the object. For example, as the shape of the object that is positioned in front of a row of LEDs changes as the object is moved, different LEDs within each row of LEDs may be activated or turned off.

As the object continues to move up the first portion may be positioned in front of another next row of the two-dimensional array of LEDs. In addition, each portion after the first portion may also move up one row to the next row of LEDs as the next portion of the object are positioned in front of the first row of LEDs. The LEDs may be controlled to follow the shape of a respective portion of the object that is positioned in front of each row of the two-dimensional array of LEDs all the way to the last row (e.g., the top most row) of the two-dimensional array of LEDs. In other words, the above process may be repeated for each row of LEDs as the object moves past the curing light source.

In one embodiment, a timing, or a sequence, of the LEDs may be controlled based on the velocity of the object. For example, the controller 124 may move the object such that each portion of the object that has marking material may have enough exposure to the light intensity emitted by the LEDs to completely cure the marking material. The amount of time needed for a particular light intensity to completely cure the marking material may be divided distance from a bottom to a top of the curing light source to determine an amount of time that each portion of the object will spend in front of each row of the two-dimensional array of LEDs of the curing light source. Thus, the sequence may be controlled in accordance with the calculated amount of time that each portion of the object twill spend in front of each row.

At block 410, the method 400 cures the marking material on the object via the one or more LEDs that are activated in the sequence that follows the shape of the object as the object moves past the curing light source. For example, the marking material may be exposed to a particular light intensity for a particular amount of time in front of the curing light source to ensure that the marking material is completely cured. As the object moves, the LEDs may be activated in the sequence to follow each respective portion of the object to ensure that each respective portion receives the proper amount of light intensity for the proper amount of time to completely cure the marking material on the surface of the object. At block 412, the method 400 ends.

It should be noted that the blocks in FIG. 4 that recite a determining operation or involve a decision do not necessarily require that both branches of the determining operation be practiced. In other words, one of the branches of the determining operation can be deemed as an optional step. In addition, one or more steps, blocks, functions or operations of the above described method 400 may comprise optional steps, or can be combined, separated, and/or performed in a different order from that described above, without departing from the example embodiments of the present disclosure.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for curing marking material on an object using an active LED array in a 3D object printer, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for curing marking material on an object using an active LED array in a 3D object printer (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for curing marking material on an object using an active LED array in a 3D object printer (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for curing marking material on an object using an active LED array in a three dimensional (3D) object printer, comprising:
   scanning the object via an optical scanner, wherein the object comprises curved surfaces;
   transmitting a scan of the object to a controller to calculate dimensions of the object and contours of the object;
   ejecting the marking material onto the object via a two-dimensional array of a plurality of printheads that is stacked vertically as the object is moved vertically along the two-dimensional array of the plurality of printheads;

moving a movable member holding the object vertically parallel to a plane formed by the two-dimensional array of the plurality of printheads towards a curing light source;

activating one or more light emitting diodes (LEDs) of a two-dimensional array of LEDs of the curing light source in a sequence that follows a shape of the object as the object moves past the curing light source based on a known velocity of the object moving past the two-dimensional array of LEDs, wherein an intensity of the one or more LEDs that are activated is based on a distance of a respective LED from a surface of the object based on the dimensions and contours of the object calculated from the scan; and curing the marking material on the object via the one or more LEDs that are activated in the sequence that follows the shape of the object as the object moves past the curing light source.

2. The method of claim 1, wherein the activating, comprises:

activating a first row of the one or more LEDs that correspond to a shape of a first portion of the object when the first portion of the object is in front of the first row of the two-dimensional array of LEDs;

activating a next row of the one or more LEDs that correspond to the shape of the first portion when the first portion of the object is in front of the next row of the two-dimensional array of LEDs and activating the first row of the one or more LEDs that correspond to a shape of a next portion of the object when the next portion of the object is in front of the first row of the two-dimensional array of LEDs; and repeating the activating the next row of the one or more LEDs that correspond to the shape of the shape of the first portion until a last row of the two-dimensional array of LEDs is passed, wherein the one or more LEDs of each previous row of the two-dimensional array of LEDs is activated that correspond to a shape of a respective portion of the object that is in front of the each previous row.

3. The method of claim 1, wherein the one or more LEDs comprise a plurality of LEDs that are activated in each one of a plurality of rows of the two-dimensional array of LEDs.

4. The method of claim 3, wherein two or more of the plurality of LEDs that are activated in the each one of the plurality of rows emit different light intensities.

5. The method of claim 1, wherein the one or more LEDs emit a light intensity having a predefined value associated with a predefined distance between the one or more LEDs and the surface of the object.

6. The method of claim 5, wherein the light intensity increases from the predefined value as a distance between the one or more LEDs and the surface of the object increases from the predefined distance.

7. The method of claim 5, wherein the light intensity decreases from the predefined value as a distance between the one or more LEDs and the surface of the object decreases from the predefined distance.

* * * * *